United States Patent [19]

Otto

[11] Patent Number: 4,650,337
[45] Date of Patent: Mar. 17, 1987

[54] FOOD PROCESSING DEVICE

[75] Inventor: Friedrich Otto, Hameln, Fed. Rep. of Germany

[73] Assignee: Stephan U. Soehne GmbH & Co., Hameln, Fed. Rep. of Germany

[21] Appl. No.: 812,846

[22] Filed: Dec. 23, 1985

[30] Foreign Application Priority Data

Sep. 5, 1985 [EP] European Pat. Off. ........ 85111195.5

[51] Int. Cl.⁴ .................. A21C 1/00; A23G 3/10; B28C 7/16
[52] U.S. Cl. .................. 366/70; 241/101 B; 241/282.1; 366/77; 366/97; 366/292; 366/299; 366/311
[58] Field of Search .................. 366/70, 77, 160, 601; 366/96–99, 69, 292, 299, 311, 601; 277/74, 88, 81 R; 241/101 B, 282.1

[56] References Cited

U.S. PATENT DOCUMENTS

| 3,727,893 | 4/1973 | Matsuoka | 366/98 |
| 3,743,192 | 7/1973 | Otto | 241/101 B |
| 4,010,932 | 3/1977 | Otto | 366/70 |
| 4,412,747 | 11/1983 | Moriyama | 366/99 |

Primary Examiner—Timothy F. Simone
Attorney, Agent, or Firm—Schwartz, Jeffery, Schwaab, Mack, Blumenthal & Evans

[57] ABSTRACT

The invention pertains to a food processing device having a mixing drum which is disposed on a support frame such that it slightly clears the floor. A horizontal tool shaft is eccentrically disposed in the drum. The mixing drum has a hinged front cover. A transport blade is disposed in the center of the front cover, and is embodied as an angled piece and provided with its own motor. To permit the device to be cleaned simply, quickly, and reliably, a special arrangement and sliding guide is provided for the outlet slide of the mixing drum. Easily-removable fasteners and seals are provided for the transport blade, the tools, and the tool shaft which bears the tools. The fasteners and seals facilitate rinsing out in the vicinity of a passage through the wall. Furthermore, a flap which closes off a feed opening on top can be provided. The flap comprises transparent material, has a contoured inner side and is removably fastened on a pivoting axis parallel to the axis of the drum.

22 Claims, 12 Drawing Figures

FOOD PROCESSING DEVICE

BACKGROUND OF THE INVENTION

The invention pertains to a food processing device having a drum which is disposed on a support frame such that it slightly clears the floor. The drum has an inlet on top, an outlet slide on the bottom, and a hinged front cover. An angled transport blade having its own motor is centrally located in the front cover. The horizontal arm of the transport blade, which has a scraping edge, lies against the inner wall of the shell of the drum. A horizontal tool shaft is overhung in the drum parallel to and below the drum axis. The horizontal tool shaft carries interchangeable tools for chopping, slicing, grating, stirring, mixing, blending, emulsifying, and/or kneading. The tool shaft extends through the rear wall of the drum and is connected for rotation to a main motor which is likewise disposed on the support frame.

An embodiment of this generic type is disclosed in U.S. Pat. No. 4,010,932. By disposing the tool shaft toward the bottom and off center, less-than-full quantities can still be processed by the tools. Thorough mixing is also achieved. The drum can hold, for example, approximately 150 liters, so that up to 100 kg of material can be processed. Since the invention pertains to a food processing device, the ease with which the machine can be cleaned takes on special significance.

SUMMARY OF THE INVENTION

The object of the invention is thus to provide an improvement of the equipment described above in the introduction in such a way that the outlet slide, transport blade, and tool shaft in particular can be cleaned simply, quickly, and reliably.

In accordance with the above object there has been provided a food processing device, comprising a drum having a top, a bottom, an inner wall, a hinged front cover, a rear wall and a central horizontal axis; a stand for support the drum; a transport blade for scraping the inner wall of the drum, and centrally rotatingly disposed in the front cover; a drive shaft for supporting the transport blade; a horizontal tool shaft for carrying a tool, overmounted in the drum and disposed below the central horizontal axis; a first central access opening in the front cover for containing the shaft of the transport blade; wherein the first access opening is of greater diameter than the shaft of the transport blade; a first sliding sealing ring disposed around the shaft of the blade for rotatingly supporting the shaft of the transport blade; a second off-center access opening for containing the tool shaft, and disposed in the rear wall of the drum, wherein the second access opening is of greater diameter than the tool shaft; a second sliding sealing ring for rotating supporting the tool shaft; first and second means for causing one of said first and second sliding sealing rings to move radially outward to create a seal.

Preferably, the device also comprises a third discharge opening disposed in the bottom of the drum, a discharge structure surrounding the discharge opening, and a one-piece plastic outlet slide arranged to cover the discharge opening and having ledges for sealing against the discharge structure.

The device also preferably comprises a guide for slidably guiding the outlet slide, and including two holding and tightening fixtures attached to the discharge structure; and a horizontal, detachable guide bar corresponding to each holding and tightening fixture, and for displaceably holding the outlet side below the ledge means.

Further objects, features and advantages of the present invention will become apparent from the detailed description of preferred embodiments which follows when considered with the attached sheets of drawing.

DESCRIPTION OF THE PREFERRED EMBODIMENTS

The objects of the invention are attained by the following features.

(a) The outlet slide comprises plastic, is of one piece, and is embodied such that a side of the slide which faces the inside of the drum is contoured. The slide has a margin comprising four strips which seal against a discharge structure. The discharge structure surrounds the discharge opening on the bottom and is securely connected to the drum.

(b) The guide for the outlet slide comprises two guide bars, each of which hangs detachably on a holding and tightening fixture affixed to the discharge structure. The guide bars are disposed in the direction of displacement and attached below two reinforcing strips on the outlet slide.

(c) For easy disassembly and cleaning or rinsing, both the central access opening, provided in the hinged front cover for the transport blade drive shaft, and the off-center access opening for the tool shaft, provided in the rear wall, have significantly larger diameters than the shafts which pass through them. A sliding seal ring is pressed into the resulting toroidal space. Tightening a tightening nut on the shaft causes the sliding seal ring to move radially outward, thus creating a seal.

It is preferred that the discharge structure have sealing surfaces corresponding to the strips on the outlet slide. The sealing surfaces comprise steel, are only a few millimeters wide, and are raised only a few tenths of a millimeter. It is also advantageous that the holding and tightening fixture for each guide bar comprise a corner piece fastened to the discharge structure. The vertical section of this corner piece enters a longitudinal groove on a clamping plate fastened to the guide bar. The clamping plate has an upwardly-projecting threaded bolt which projects through a slot in the corner piece. The slot is open to the side. The free end of the bolt carries a tightening nut which presses on the corner piece through a cup spring.

Firstly, merely loosening the two tightening nuts makes it possible to remove the outlet slide simply and quickly. Secondly, the arrangement of cup springs makes it possible to achieve a definite contact pressure between the sealing surfaces and the reinforcing strips on the outlet slide. This configuration ensures a reliable seal and simultaneously guarantees that the outlet slide can slide without binding or snagging. The sealing surface embodiment just described ensures sufficient surface pressure and minimizes wear. The sealing, wear, and sliding properties are optimal when the outlet slide comprises polyamide. This material further makes it possible to clean the slide simply and reliably.

It is advantageous that each of the sliding seal rings for the transport blade and tool shafts comprise two identical steel rings with a rubber sleeve. According to the invention, the transport blade, along with a bearing which rests on the sliding seal ring, is inserted onto the drive shaft. The drive shaft is a splined shaft which projects through the front cover. The transport blade is removably secured by a large cap nut. The cap nut screws onto a threaded bolt which is fastened to the face of the splined shaft. The cap nut is pressed against the bearing by an annular sealing gasket. It is advantageous that the tightening nut which rests on the sliding sealing ring on the tool shaft be a bayonet ring. It is a simple matter to remove the transport blade from the splined shaft by loosening the cap nut.

Loosening the cap nut releases the sliding seal ring which then can likewise be removed simply from the splined shaft. Loosening the nut opens up the toroidal space described above, through which it is possible to simply and reliably rinse the interior of the drum clean. The rinse water runs off the outside of the drum. The sliding sealing ring on the tool shaft can be released in the same manner by loosening the aforementioned bayonet ring. After removal of the sliding sealing ring, it is possible to rinse the interior of the drum clean from the inside out through the resulting toroidal space.

The inlet on top of the drum can be disposed on the drum shell slightly below the shell's highest point facing the operator side. This makes the device easy to operate even for people of moderate height, despite its large capacity. Nonetheless, there are various alternatives for how the finished product can be removed. The drum can be placed so high on the support frame that a container wagon, for example, or a conveyor device can be slid into place beneath the outlet slide.

For feeding the drum manually, it is advantageous that the feed opening on top be closable by a flap comprising transparent material. The flap preferably has a contoured inside. The flap is preferably removably secured on a pivoting axis which lies parallel to the drum axis. On the one hand, this makes it possible to add ingredients by hand; on the other hand, it allows the processing of the material to be viewed through the flap.

If the inside of the transparent flap is contoured, the scraping edge of the transport blade would also slide over the flap. In the case of materials which tend to smear, this detracts strongly from the transparency of the flap. It can thus be advantageous to have at least one portion of the contoured inner surface of the flap set back somewhat with respect to the inner surface of the drum shell. Even if the inner surface is set back approximately 1 mm, the flap remains clear in this area.

The drum can also be fully automatically fed through a snorkel, funnel, hose, or the like. The flap is then replaced by a fixed funnel with appropriate attachments.

The drum shell can also be embodied with a double wall if heating or cooling of the drum is desired. The device can also be set up for operation in a partial vacuum or under pressure. Steam valves or the like which empty into the drum can then be provided.

It is advantageous that an electronic thermometer project into the drum for exact temperature measurement. A timer for preset control for ending kneading time, for example, can be provided on the control panel provided on the operator side. Furthermore, an output chronograph or a current chronograph can be provided. The readings can then show the optimal kneading process or the optimal energy input into the material to be processed.

The features of the present invention result in a flap which is easy to install and remove, and one which is simple and quick to clean. Even the clamp handle in the plate can be removed quickly. The pocket-shaped recess is as large as possible and embodied with shallow curves so that, even here, safe and simple cleaning is possible. The aforementioned runoff opening lets material that was spilled or which splashes out when the flap is opened run back into the interior of the drum. To this end, it is advantageous that the runoff opening be provided in the lower-lying hopper wall, whose inner surface is only shallow with respect to the horizontal toward the top.

The invention comprises a reliably-functioning, user-friendly food processing device, the inlet and outlet of which are simply-conceived and can be watertight and, if required, airtight. The new device will meet the most stringent sanitary requirements, while avoiding gaps and hard-to-clean places in the food zones. For uncomplicated cleaning, the parts in the food-zones can be installed or removed with few operations.

Figure 1:
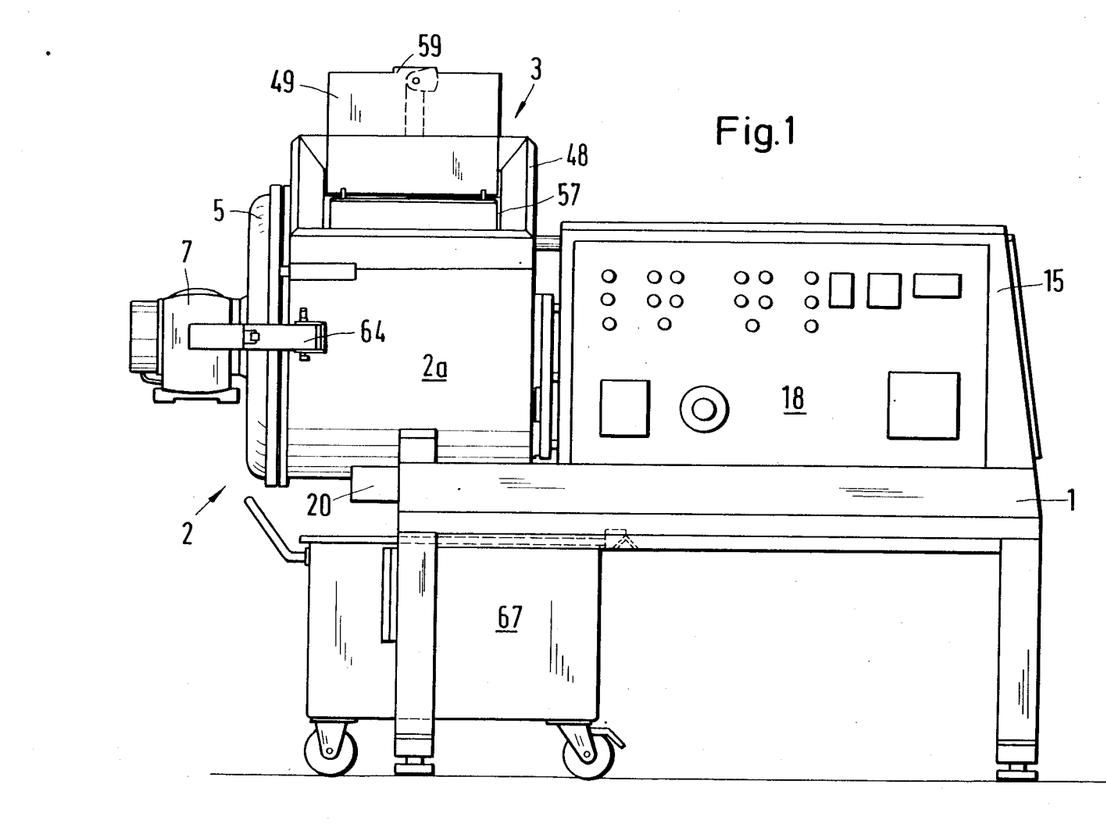
FIG. 1 shows a side view of the food processing device of the present invention with a container vehicle parked beneath.
Figures 7, 7A, 7B, 7C:
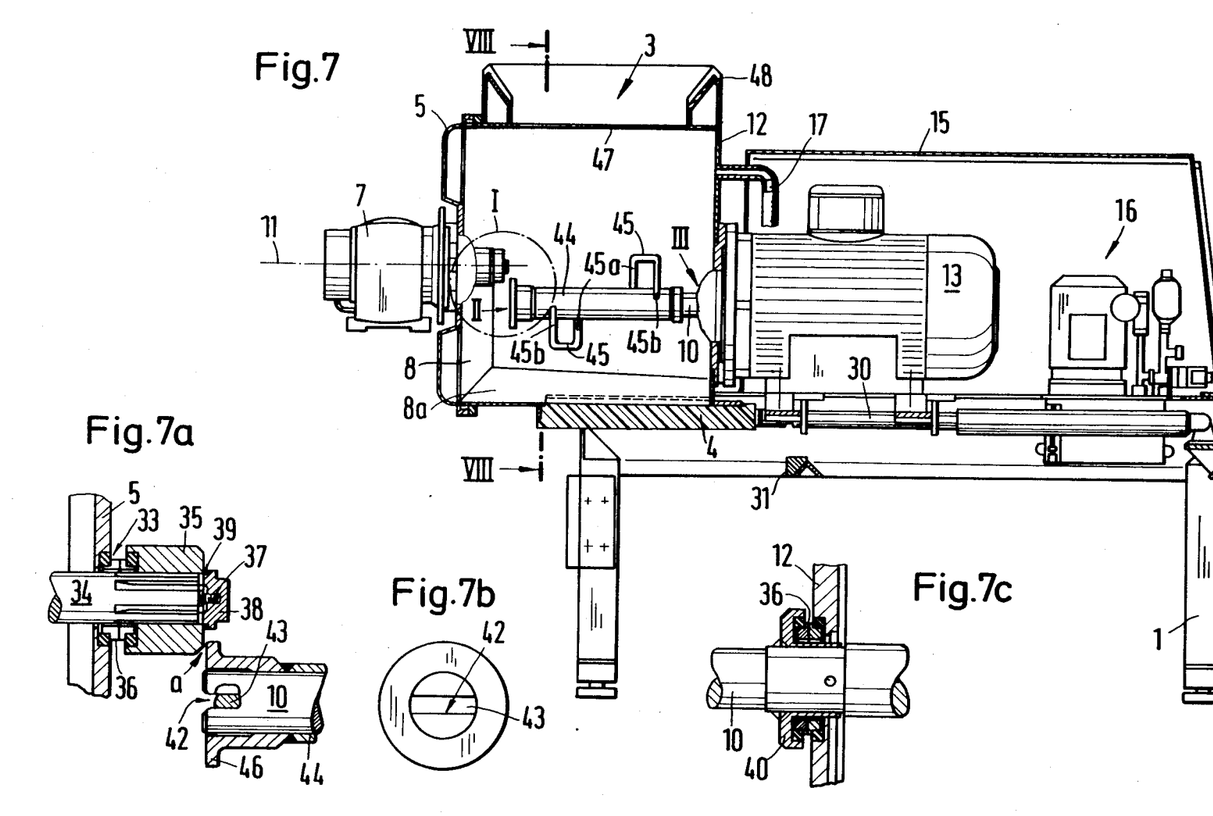
FIG. 7 shows a longitudinal view through the device according to FIG. 1 (without the container wagon)
FIG. 7a shows a magnified longitudinal view of the detail in FIG. 7 shown by the dashed circle marked I.
FIG. 7b shows the front end of the tool shaft, magnified, looking in the direction marked II in FIG. 7.
FIG. 7c shows a magnified longitudinal view of the detail marked with arrow III in FIG. 7.

The food processing device shown especially in FIGS. 1 and 7 includes a mixing drum 2 which is disposed on a support frame 1 such that it slightly clears the floor. The mixing drum has an inlet 3 on top, an outlet slide 4 on the bottom. On the left end of the mixing drum 2 in FIG. 1, a front cover 5 is connected by a hinge which allows it to swing along a vertical axis 6. An angled transport blade 8 (see FIG. 7) with its own motor 7 is centrally located in the front cover. The horizontal arm 8a of the transport blade, which has a scraping edge 9, lies against the inner wall of the shell 2a of the mixing drum 2 (see FIG. 8). A horizontal tool shaft 10 is over-mounted in the mixing drum 2 parallel to and below the drum axis 11.

The rear wall 12 of the mixing drum 2 is securely connected by a flange to a main motor 13. The motor 13 drives the tool shaft 10 which projects through the rear wall 12. The mixing drum 2 and main motor 13 are situated on the vibration mount 14 on the top of the support frame 1. The main motor 13 is located with a housing 15, which encases, among other things, a hydraulic drive 16 to activate the outlet slide 4.

A water injection conduit 17 is welded into the upper region of the rear wall 12. Water can be sprayed through the conduit 17 onto the inner wall of the drum shell 2a at a predetermined angle. Not shown in greater detail are a water meter and an adjustment device provided on a control panel 18, where the quantity of water can be preset.

The one-piece outlet slide 4 is embodied such that a side which faces the inside of the mixing drum 2 is contoured to lie precisely within the inside contour of the mixing drum 2. The discharge opening 19 on the bottom (see FIG. 8) is surrounded by a discharge structure 20. The structure 20 has steel sealing surfaces 21 which are only a few millimeters wide and are raised only a few tenths of a millimeter. These sealing surfaces 21 work in concert with the upper surface of two reinforcing strips 22 disposed on the margin of the outlet slide 4. The guide for the outlet slide 4 comprises two guide bars 23 disposed below the two reinforcing strips 22. Each of the strips 22 hangs detachably on a holding and tightening fixture affixed to the discharge structure 20. The latter fixture comprises a corner piece 24 fastened to the discharge structure 20. The vertical section 24a of the corner piece enters a longitudinal groove on a clamping plate 25 fastened to the guide bar 23. The clamping plate has an upwardly-projecting threaded bolt 26. The bolt projects through a slot 27 in the corner piece 24. The slot is open to the side. The free end of the bolt carries a tightening nut 28 which presses on the corner piece 24 through a cup spring 29. Comparable sealing surfaces 21 work in concert with the cross-strips 22a provided in the two faces of the outlet slide 4 (see FIG. 7d). The back face of the outlet slide 4 hangs on a hydraulic rod 30 activated by the hydraulic drive 16.

Figure 7D:
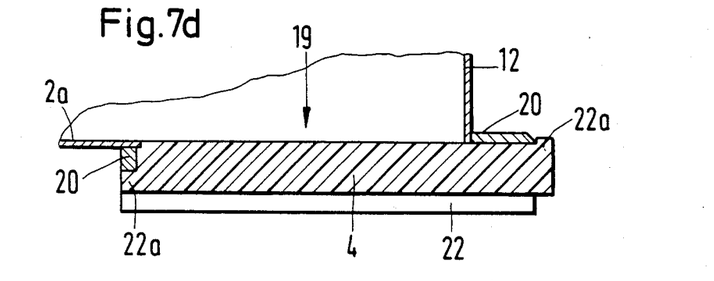
FIG. 7d shows a magnified representation of an outlet slide according to FIG. 7.
Figure 8:
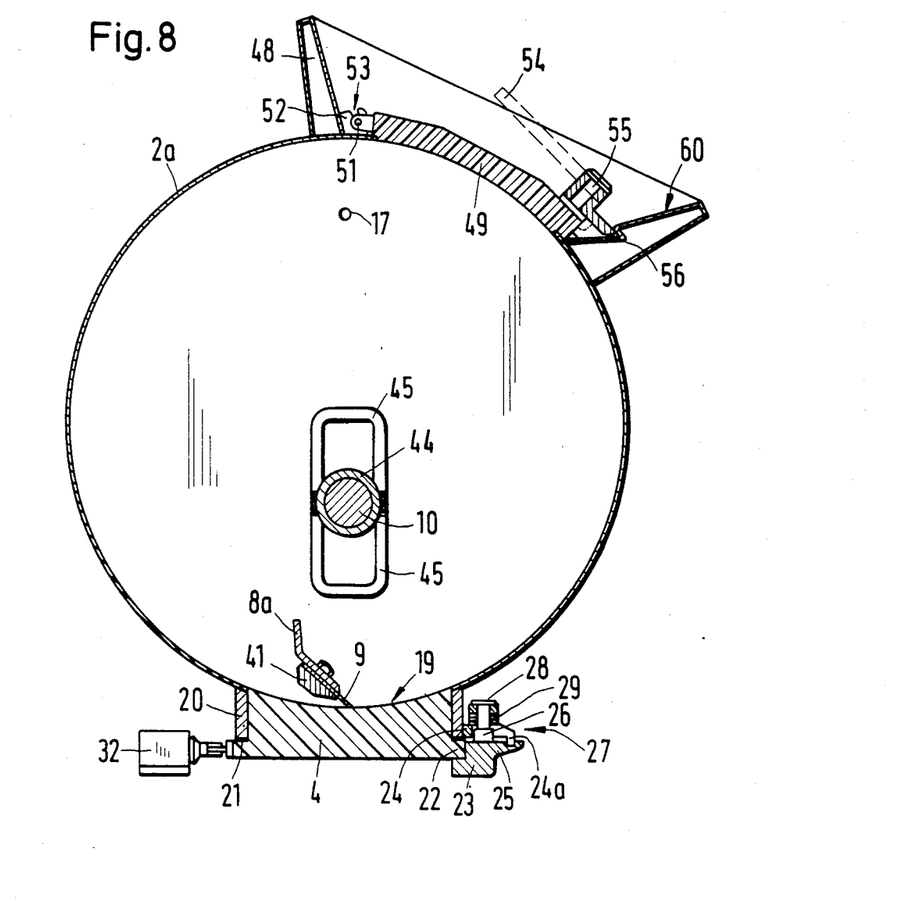
FIG. 8 shows a magnified cross section of the excerpt along line VIII—VIII in FIG. 7.

Tightening the two tightening nuts 28 produces a definite contact pressure between the sealing surfaces 21 and the strips on the outlet slide 4 due to the cup springs 29 in between the nuts 28. A reliable seal which still permits the outlet slide 4 to slide without binding is thus achieved. To remove the outlet slide 4 it is necessary only to loosen the two tightening nuts 28, which, by the way, can remain on the threaded bolts 26 together with the cup springs 29. It is then easy to pull the guide bars 23 to the side, which draws the threaded bolts 26 from the matching slit 27. The outlet slide 4 then drops down until it rests against a block 31. The outlet plate 4 which continues to hang from the hydraulic rod 30, the discharge opening 19, the discharge structure 20, and the holding and tightening fixture 24 through 29 can then all be cleaned simply, reliably, and quickly.

In a closed position, the outlet slide 4 rests on a limit switch 32 (see FIG. 8), which then permits the various functions of the equipment.

A central access opening is provided in the front cover 5. The splined shaft 34, on which the motor 7 rests, projects through this opening. The transport blade 8 having a bearing 35, is slid onto the shaft 34 and fastened to turn with shaft 34. The access opening 33 has a significantly greater diameter than the splined shaft 34. A sliding sealing ring 36 is pressed into the toroidal space thus formed. The ring 36 comprises two identical steel rings with a rubber sleeve (see FIG. 7a). A large-sized cap nut 38 is screwed onto a threaded bolt 37 that is fastened to the face of the splined shaft 34. The cap nut presses the bearing 35 with an annular sealing lip 39 against the sliding sealing ring 36, thus radially deforming the ring 36 outwardly.

The seal between the rear wall 12 and the tool shaft 10 essentially matches the construction just described. Instead of the threaded bolt 37 with cap nut 38, a tightening nut 40 in the form of a bayonet ring is provided. The bayonet ring is slid onto the tool shaft 10. The bayonet ring can be twisted, using a wrench, into place in a matching receptacle in the rear wall 12. Twisting the bayonet ring places pressure on the sliding sealing ring 36 located in the toroidal space between the tool shaft 10 and the rear wall 12, deforming the ring 36 radially outwardly (see FIG. 7c).

While the transport blade rotates slowly, for example at 20 RPM, the tool shaft 10 can rotate at 750–1,200 RPM when the food processing equipment is used as a kneading machine.

As is seen in FIG. 8, the scraping edge 9 on the transport blade 8 comprises a strip of plastic which is affixed so that it is easily removable by a clamping strip screwed to the horizontal arm 8a of the transport blade 8. The free end of the tool shaft 10 has a recessed radial slit 42 open toward the front. A cross bolt 43 on a tool socket 44 fits into the slit 42 and is thus inserted onto the tool shaft 10. The tool socket 44 bears the tools 45 and an anular shoulder 46 on the end facing the front cover 5. The annular shoulder 45 is separated from the tightening nut 38 which fastens the transport blade 8 by a small clearance "a".

The transport blade 8 and tools 45 are simple to install and remove. To remove the transport blade 8, the cap nut 38 is loosened, allowing the transport blade 8 to be removed from the splined shaft 34. The sliding sealing ring 36 can subsequently be removed. Removing the ring 36 opens up the toroidal space between the splined shaft 34 and the front cover 5, making it simple to rinse out through this toroidal space for cleaning. The rinse water then simply flows out. Loosening the screw connection which holds the clamping strip 41 makes it quick and easy to remove and clean the scraping edge 9. The tool socket 44 only needs to be pulled off the tool shaft 10. After loosening the tightening nut 40 and removing the sliding packing ring 36, the toroidal space thus created between the tool shaft 10 and the rear wall 12 can be rinsed from the inside out here as well. The rinse water exits the mixing drum 2 between its rear wall 12 and the main motor 13 flanged to the drum.

The transport blade and tool are installed analogously. Should the tool shaft 10 start up during assembly of the equipment, the inertia of the mass or a resistance applied to the tool 45 will produce a slight relative displacement of the tool socket 44 and the tool shaft 10. An auto-braking effect, resulting from the cross bolt 43 reaching behind the recess in the radial slit 42 is thus produced. Even if the tool socket 44 should slip axially along the tool shaft, the annular shoulder 46 on the tool socket 44 would come to rest against the cap nut 38, thus limiting the axial slippage and rendering it harmless.

The tool socket 44 can hold tools for chopping, slicing, grating, stirring, mixing, blending, emulsifying, and/or kneading. The exemplary embodiment in FIGS. 7 and 8 shows a kneading tool which is particularly suited for stiffer doughs. Here, the tool socket 44 has two identically embodied U-shaped kneading tools 45 offset 180° from each other and with an axial clearance from each other. The tools 45 are attached to the opposite sides of the tool socket 44 in such a way that the ends of the neighboring U-shaped arms 45a are on the one side of the socket and the ends of the two axially outermost U-shaped arms 45b are on the other side of the socket (see FIG. 7). When the tool socket 44 is viewed from the front, the two tools 45 form an apparently closed curve shaped like a shallow rectangle (see FIG. 8). Both tools 45 are bent from round stock, and are thus easy to clean.

Figure 5:
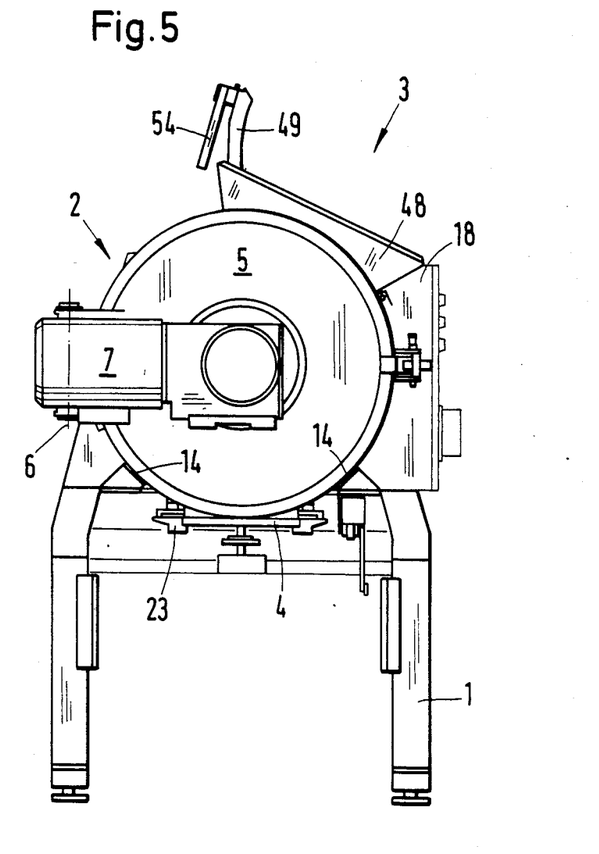
FIG. 5 shows a front-end view of the device according to FIG. 3.

FIGS. 5 and 8 in particular make it clear that the inlet 3 on the top of the mixing drum 2 can be disposed on the drum shell 2a slightly below the latter's highest point facing the operator side. This arrangement is practical when the mixing drum 2 is to be loaded manually while allowing the interior of the drum to be observed. In this exemplary embodiment, the feed opening 47 includes a flap 49 and is surrounded on all sides by a shallow hopper 48 having hollow walls. The flap 49 is made of a transparent material, and its inside is contoured. The top longitudinal edge of the flap 49 is removably secured on a pivoting axis 50 which lies parallel to the drum axis 11. The pivoting axis 50 has two pins 51 connected to the flap 49. One of the pins 51 is axially inserted into a matching lug 52. The other pin 51, which has a radial flattening (not shown), and is inserted into an appropriately-sized slot 53 in a second lug 52. The flap 49 can be latched by a pivoting clamp handle 54. The clamp handle is removably attached to the flap 49 by a screw connection 55. The lower longitudinal wall of the hopper 48 has a pocket-shaped recess 56 to engage the clamp handle 54. A support shoulder 57 for the flap 49 is provided inside the hopper 48. If necessary, the shoulder 57 is formed from the drum shell 2a. The support shoulder 57 has a channel in the vicinity of the recess 56. The channel forms a runoff opening 58 into which a suitably-sized sealing ridge 59 on the flap 49 snugly fits when the flap is closed. The inner surface 60 of the lower longitudinal wall of the hopper 48 inclines only slightly upward from the horizontal (see especially FIG. 8).

Figure 6:
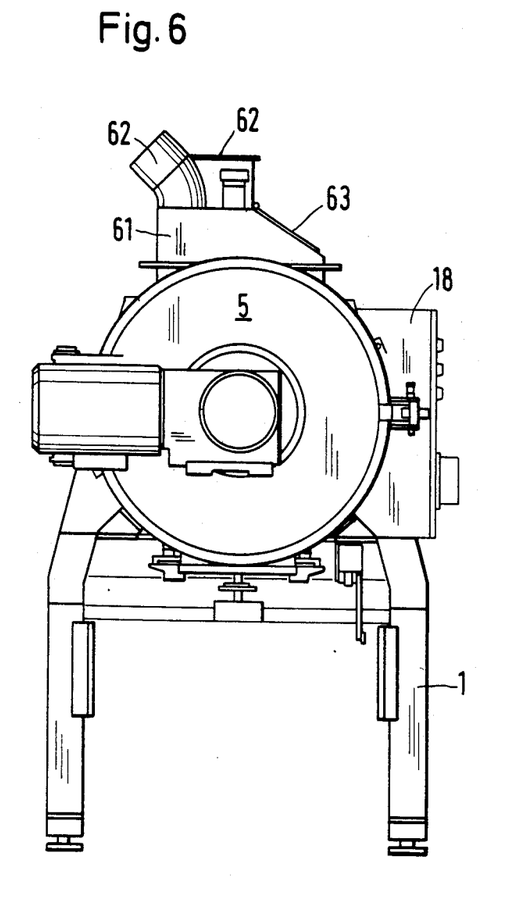
FIG. 6 shows a representation, according to FIG. 5, of a modified embodiment of the present invention.

FIG. 6 shows a modified embodiment of the inlet 3 on top. Here, the inlet 3 is located at the highest point of the drum shell 2a and is enclosed on all sides by a connecting pipe 61 which has connections for hoses and pipes 62, and a viewing and servicing flap 63.

The front cover 5 has an off-center elbow lever latch 64 which surrounds an easily removable rotating axle 66 for supporting the hand lever 65.

According to FIG. 1, a container vehicle 67 which can be pulled out from under the support frame 1 is positioned below the outlet slide 4. The container vehicle, shown in the filling position, contacts a contact switch (not shown). When the container vehicle 67 is pulled out, this contact switch stops the machine.

Figure 2:
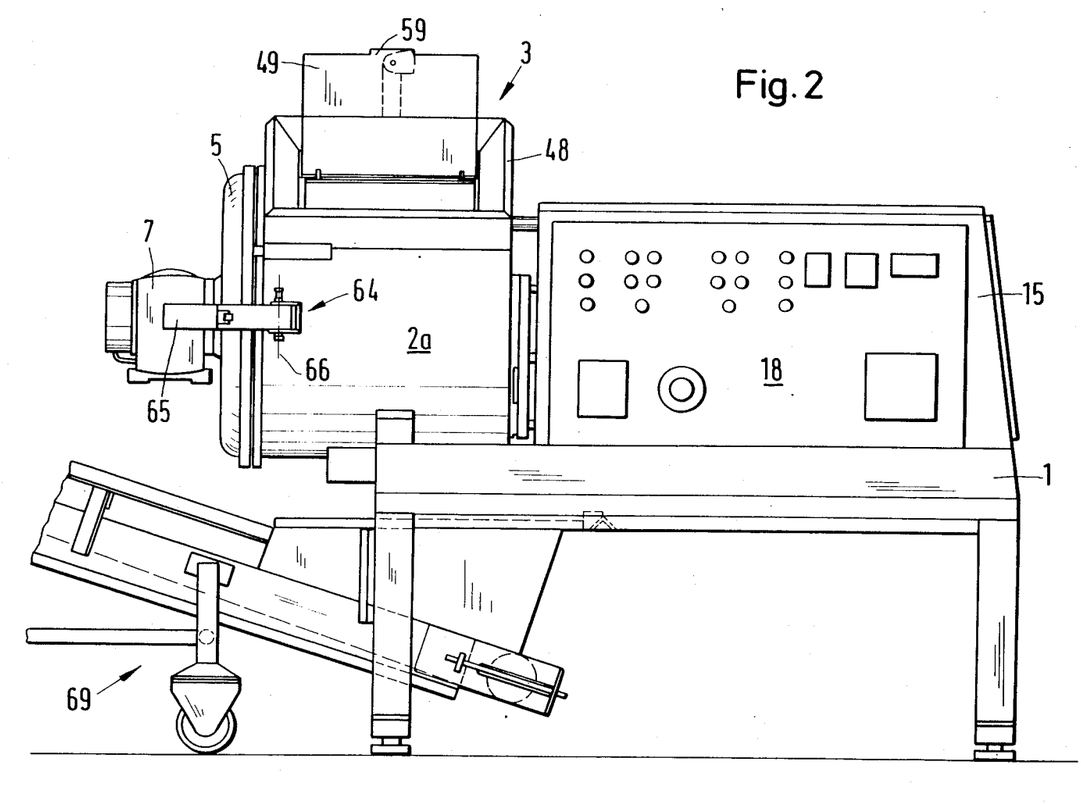
FIG. 2 shows a representation according to FIG. 1, wherein the container vehicle is replaced by a conveyor device.
Figure 3:
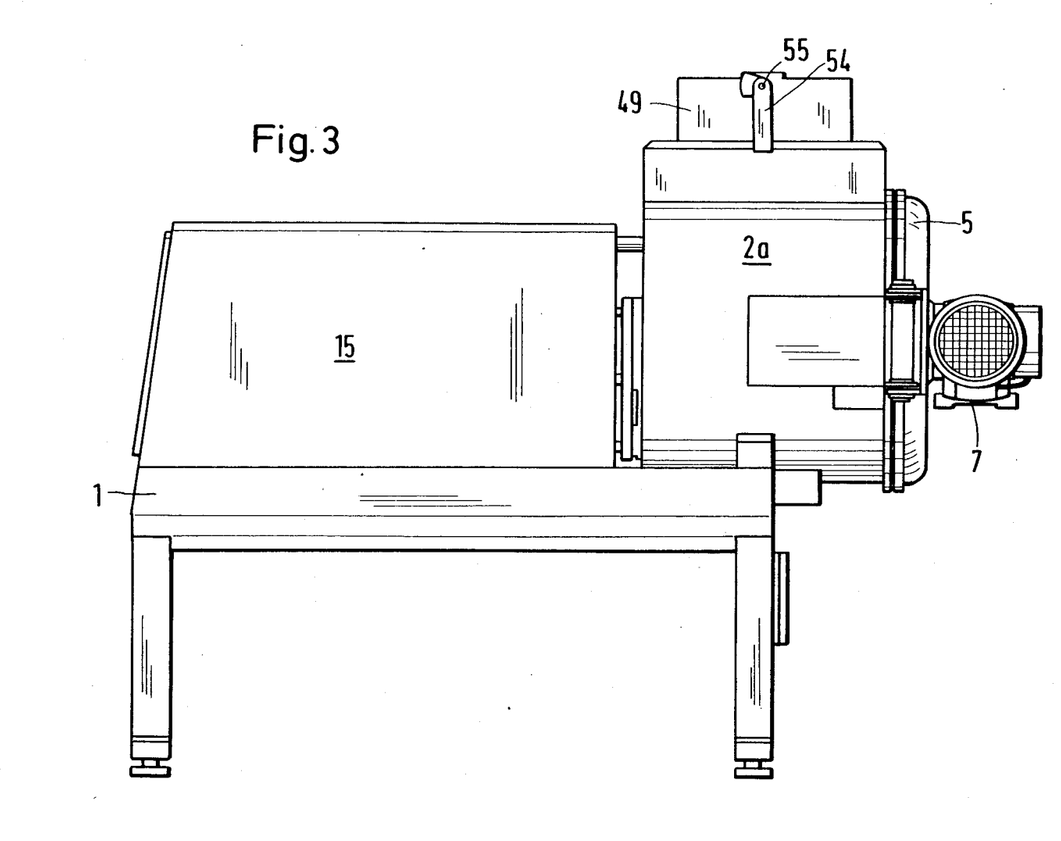
FIG. 3 shows a rear view of the device according to FIG. 1 (without the container vehicle)

In the exemplary embodiment illustrated in FIG. 2, a conveyor device 69 is pushed under the outlet slide 4 instead of a container vehicle.

Figure 4:
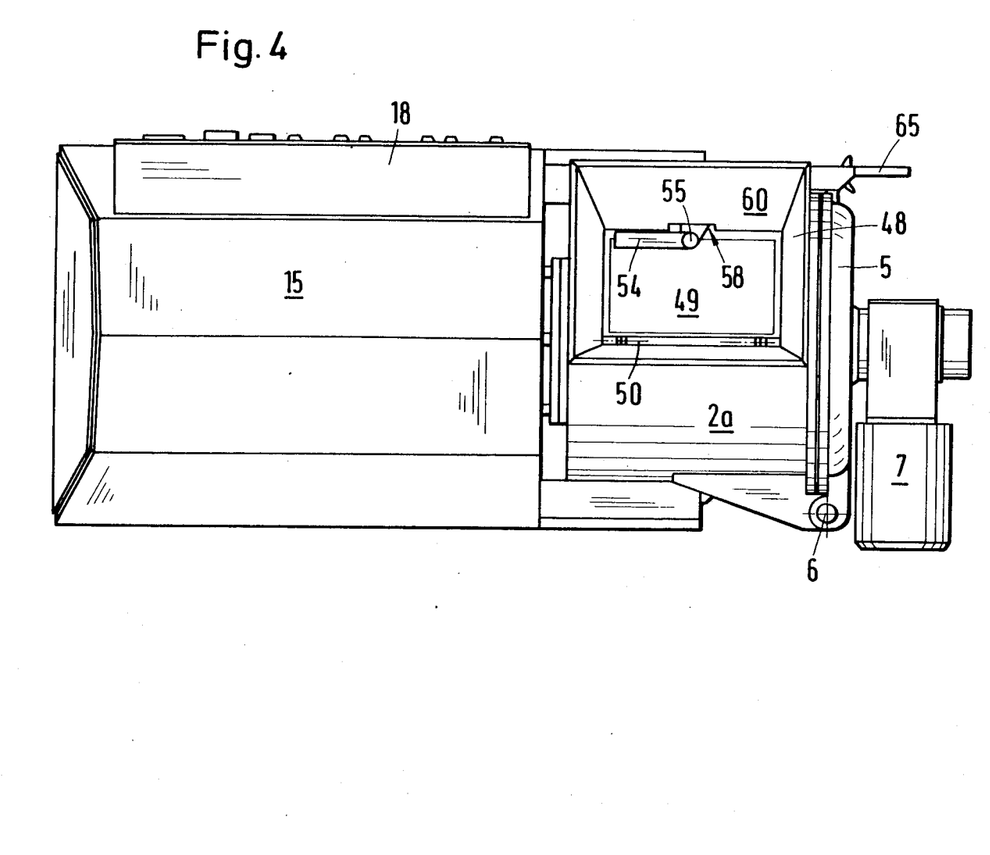
FIG. 4 shows a top view of the device according to FIG. 1.

FIGS. 1, 2, 3, and 5 show the flap 49 open, while this flap is closed in the illustrations in FIGS. 4 and 8. The flap was omitted in FIG. 7 for a better overview. The flap is latched by a magnetic switch which is not described in greater detail. If it is desired that the device should operate under a vacuum, the flap 49 is equipped with an appropriate seal.

A position switch, not described in any greater detail, is provided for the transport blade 8, in order to guarantee that the transport blade does not come to rest under the inlet 3 on top or above the outlet slide 4.

When closed, the front cover 5 contacts a limit switch, not shown, which stops the machine when the front cover is opened.

What is claimed is:

1. A food processing device, comprising:
   a drum for containing foodstuff to be processed, said drum having a top, a bottom, an inner wall, a hinged front cover, a rear wall and a central horizontal axis;
   a stand for supporting the drum;
   a transport blade for scraping the inner wall of the drum, said transport blade being centrally mounted in the hinged front cover for rotation about the central horizontal axis of the drum;
   a drive shaft for supporting the transport blade;
   a horizontal tool shaft for carrying a tool, overmounted in the drum and disposed below the central horizontal axis;
   a central access opening in the hinged front cover for containing the transport blade drive shaft, wherein the access opening is of greater diameter than the transport blade drive shaft;
   a sliding sealing ring disposed around the drive shaft of said transport blade for rotatingly supporting the drive shaft of the transport blade in said central access opening;
   an off-center access opening for containing the horizontal tool shaft, and disposed in the rear wall of the drum, wherein the off-center access opening is of greater diameter than the horizontal tool shaft;
   a sliding sealing ring for rotatingly supporting the horizontal tool shaft in said off-center access opening;
   first and second means for selectively deforming each of said first and second sliding sealing rings radially outward to create a radially directed seal, whereby said drive shaft and said horizontal tool shaft can be easily removed from said access openings for cleaning.

2. A device as recited in claim 1, further comprising:
   a discharge opening disposed in the bottom of the drum;
   a discharge structure surrounding the discharge opening; and
   a one-piece plactic outlet slide arranged to cover the discharge opening, and having ledge means for sealing against the discharge structure.

3. A device as recited in claim 2, further comprising a guide for slidably guiding the outlet slide, and including two holding and tightening fixtures attached to the discharge structure; and a horizontal detachable guide bar corresponding to each holding and tightening fixture, and for displaceably holding the outlet slide below the ledge means.

4. A device as recited in claim 2, further comprising steel sealing surfaces on the discharge structure having widths of a few millimeters and being raised a few tenths of a millimeter.

5. A device as recited in claim 3, wherein the guide includes a clamping plate having a longitudinal groove and an upwardly-projecting tightening bolt; wherein the holding and tightening fixture includes a corner piece fastened to the discharge structure; wherein the corner piece includes a vertical section arranged to fit in the longitudinal groove, and a slot containing the tightening bolt; and wherein the tightening fixture further includes a nut on the bolt and a cup spring for tightening the corner piece against the clamping plate.

6. A device as recited in claim 1, further comprising a motor disposed on the hinged front cover for moving the transport blade; wherein the transport blade includes an angled section attached to the drive shaft and a horizontal section having a scraping edge for scraping the inner wall of the drum.

7. A device as recited in claim 2, wherein said outlet slide comprises polyamide.

8. A device as recited in claim 1, wherein the first and second sliding sealing rings each comprise two identical steel rings and a rubber sleeve.

9. A device as recited in claim 1, wherein the transport blade drive shaft comprises a splined shaft; wherein the transport blade comprises a bearing placed on the transport blade drive shaft; and further comprising a cap nut fastening the bearing to the transport blade drive shaft, and having an annular sealing lip pressed against the bearing.

10. A device as recited in claim 1, further comprising a bayonet ring engaging said second sliding sealing ring.

11. A device as recited in claim 1, further comprising an inlet on the top of the drum disposed below a highest point of the drum.

12. A device as recited in claim 11, further comprising a pivotable transparent flap arranged to cover said inlet and having a contoured inside and a pivoting axle lying parallel to said central axis.

13. A device as recited in claim 12, wherein said pivoting axle comprises a first pin connected to the flap, and a second pin having a flattened region and connected to the flap; and further comprising a first lug pivotally containing the first pin, and a second lug having a slot containing the second pin.

14. A device as recited in claim 12, futher comprising a clamp handle arranged to secure said flap against said drum, wherein the clamp handle is removably attached to the flap.

15. A device as recited in claim 14, further comprising a hopper surrounding the inlet, wherein the hopper includes a recess arranged to engage said clamp handle, and a runoff channel disposed near the recess; and wherein said flap further comprises a sealing ridge arranged to fit in the runoff channel.

16. A device as recited in claim 15, wherein the hopper comprises a lower wall slanting shallowly upward from the horizontal; and wherein said runoff channel is disposed in the lower wall.

17. A device as recited in claim 12, wherein said inner surface of the flap comprises a portion set back from said inner wall of the drum.

18. A device as recited in claim 6, wherein said scraping edge comprises a strip of plastic; and wherein said horizontal section comprises a clamping strip for removably clamping the scraping edge.

19. A device as recited in claim 1, further comprising a horizontal tool socket arranged to fit on the tool shaft, having a cross bolt, and an annular shoulder facing said drive transport blade drive shaft and separated by a small clearance from the transport blade drive shaft; wherein the horizontal tool shaft comprises a radial slit arranged to contain the cross bolt.

20. A device as recited in claim 19, further comprising first and second U-shaped kneading tools each having first and second ends, wherein the tools are disposed on the tool socket separated by an axial distance and rotated by 180°; and wherein the first end of the first tool and the second end of the second tool are disposed on a first side of the tool socket, and the second end of the first tool and the first end of the second tool are disposed on a second side of the tool socket.

21. A device as recited in claim 1, wherein the front cover comprises an off-center toggle lever latch having an easily removable latch axle, and further comprising a handle disposed on the latch axle.

22. A device as recited in claim 1, wherein said means for selectively radially outwardly deforming said sliding sealing rings comprises a tightening nut which is axially displaceable along the respective transport blade drive shaft and horizontal tool shaft.

* * * * *